United States Patent [19]

Crump et al.

[11] Patent Number: 4,799,995
[45] Date of Patent: Jan. 24, 1989

[54] SCALE INHIBITION FORMULATIONS FOR KRAFT DIGESTERS

[75] Inventors: Druce K. Crump; Lance A. Cooper, both of Lake Jackson; Thomas M. Hopkins, Kilgore, all of Tex.

[73] Assignee: The Dow Chemical Company, Midland, Mich.

[21] Appl. No.: 79,307

[22] Filed: Jul. 29, 1987

[51] Int. Cl.$^4$ .................................................. C02F 5/14
[52] U.S. Cl. ........................................ 162/76; 162/82; 210/700; 252/180
[58] Field of Search ........................ 252/180; 210/700

[56] References Cited

U.S. PATENT DOCUMENTS

| | | | |
|---|---|---|---|
| 3,434,969 | 3/1969 | Ralston | 252/180 |
| 3,784,469 | 1/1974 | Krueger et al. | 252/180 |
| 3,992,249 | 11/1976 | Farley | 162/72 |
| 4,056,430 | 11/1977 | Hoeger et al. | 162/76 |
| 4,092,244 | 5/1978 | Suen et al. | 210/699 |
| 4,105,573 | 8/1978 | Jacobsen | 252/99 |
| 4,184,912 | 1/1980 | Payton | 162/72 |
| 4,240,921 | 12/1980 | Kaniecki | 252/156 |
| 4,253,912 | 3/1981 | Becker et al. | 162/76 |
| 4,255,309 | 3/1981 | Klaessig et al. | 162/30 |
| 4,406,811 | 9/1983 | Christensen et al. | 252/180 |

FOREIGN PATENT DOCUMENTS 1123307  5/1982  Canada ................................. 252/180

OTHER PUBLICATIONS

Svensk Papperstidning arg. 75, No. 2, 31 Jan. 1972.
Canadian Pulp and Paper Industry, Apr., 1976 pp. 25-27.
Tappi Journa, Apr. 1980, pp. 125-127.
Tappi Journal, May 1982, pp. 179-180.

Primary Examiner—Robert A. Wax
Attorney, Agent, or Firm—A. Cooper Ancona

[57] ABSTRACT

Inhibition of calcium scale under the extreme temperature conditions found in pulp digesters has been accomplished by employing certain mixtures of polaminopoly(alkylenephosphonic acids) together with nonionic surfactants. Diethylenetriaminepenta(methylenephosphonic acid) together with a polyethoxynonylphenol has been found especially effective for the purpose.

5 Claims, No Drawings

SCALE INHIBITION FORMULATIONS FOR KRAFT DIGESTERS

BACKGROUND OF THE INVENTION

Scale formation in the apparatus employed in the making of kraft papers is especially prevalent under the conditions ordinarily employed, namely the cooking of the wood chips at high temperatures in aqueous media containing caustic, sodium carbonate, and sodium sulfide. Under such conditions the calcium present in the water can react with the carbonate and produce rapid scaling from deposition of $CaCO_3$ which can constrict the slots of the digester screens and cause unscheduled shutdowns of the equipment.

In addition to the calcium in the water, scale forming amounts of calcium, manganese, sulfur and magnesium may be leached from the wood chips as they pass through the digester. Organic constituents, found naturally occurring in the wood, are also leached in the digester and some of these organic constituents apparently have a chelating effect and actually prevent the precipitation of mineral scale e.g. $CaCO_3$, at low temperatures. The metal-chelant complexes so-formed probably decompose at the higher temperatures during the cooking process, permitting the precipitation of inorganic scales. Some organic constituents of the wood also produce scale which deposits in polymeric form, and is commonly referred to as "pitch". Pitch deposit is often a problem, but this occurs most often at the lower temperatures and pH ranges encountered after the cooking step in the digester in a kraft mill.

Various additives have been employed in efforts to control the deposition of scale. Low molecular weight polyectrolytes have been employed. In particular, the use of a proprietary mixture of low molecular weight anionic polyelectrolytes and sequestrants is reported in an article in *Canadian Pulp and Paper Industry*, April, 1976, pp. 25–27. The article reports an improvement in cleaning frequency of from weekly before treatment to one to two months after treatment. The length of time required to clean the digester heater was also reduced.

Phosphonates which have been commonly used to control scale include nitrilotri(methylenephosphonic acid) (NTMP), diethylenetriaminepenta(methylenephosphonic) acid (DTPMP) and 1-hydroxyethane-1,1-disphosphonic acid (HEDP). These compounds are used in the acid form or the form of their water soluble salts, e.g. ammonium and alkali metal salts. In U.S. Pat. No. 4,253,912 there is disclosed the use of certain oligomeric phosphonic acid derivatives. These are condensate oligomers prepared by reacting an alkanoyl chloride or an organic acid anhydride with a 1-hydroxyalkane-1,1-disphosphonic acid compound. In an example, phosphorous acid and propionic anhydride are reacted to produce one such oligomer; another is formed by reacting with heating phosphorous acid and decanoyl chloride and subsequently pouring the thick melt formed into acetic anhydride. These oligomeric products are said to inhibit the precipitation of calcium at threshold levels.

Other additives have been employed in aqueous systems to control deposition of scale. Thus, for example, in cooling water systems and in pulp and paper mill applications phosphonate-type chelants have been used.

In U.S. Pat. No. 4,406,811 there is disclosed a composition for control of corrosion and scale in aqueous systems containing multiple metallurgies, e.g. industrial cooling equipment. Such compositions contain (a) a triazole or a mercaptotriazole, (b) an aliphatic mono- or dicarboxylic acid, (c) a nonionic wetting agent and (d) a phosphrous-containing organic scale inhibiting compound, eg. HEDP or NTMP.

It has now been discovered that certain polyaminopoly(methylenephosphonic acid) compounds together with certain nonionic surfactants provide excellent control of scale due to calcium under the extreme temperature conditions found in pulp digesters.

SUMMARY OF THE INVENTION

Certain mixtures containing polyaminopoly(methylenephosphonic acids), together with a nonionic surfactant, have been found to be excellent inhibitors of calcium scale under the extreme temperature conditions found in pulp digesters.

The combination of diethylenetriaminepenta(methylenephosphonic acid) with a polyethoxynonylphenol has been found especially effective for this purpose. Also, the use of naturally derived nonionic surfactants, such as alkyl glucosides and oligosaccharides, provides a homogeneous formulation at a substantially neutral pH.

DETAILED DESCRIPTION OF THE INVENTION

The polyaminopoly(methylenephosphonic acids) which are included in the present invention are those having the formula

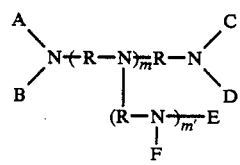

wherein substituents A, B, C, D, E and F are independently selected from hydrogen or

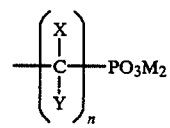

wherein X and Y are independently selected from hydrogen, $PO_3M_2$ and hydrocarbon radicals having from 1–3 carbon atoms and wherein n is 1–3, with the proviso that when $n>1$, each X and Y may be the same as or different from any other X or Y on any carbon atom, and wherein M is hydrogen, ammonium or an alkali metal; and wherein R is a hydrocarbon residue which can be a linear, branched, cyclic, heterocyclic, substituted heterocyclic, or a fused ring-type structure and m and m' is each 0–2500; with the further proviso that when m or $m'>1$, the E and F substituents may be the same as or different from any other nitrogen atom substituent and each R may be the same as or different from any other R.

Some specific, but non-limiting, examples of compounds which are included by the above structures are bis(aminomethyl)dicyclopentadienetetra(methylenephosphonic acid), bis(aminomethyl)bicycloheptanetetra(methylenephosphonic acid), ethylenediaminetetra(- methylenephosphonic acid), diethylenetriaminepenta(-methylenephosphonic acid), (DETA-PMP), pentaethylenehexamineocta(methylenephosphonic acid), hexamethylenediaminetetra(methylenephosphonic acid), piperazinedimethylenephosphonic acid and phosphonomethylated polyalkylene polyamines, having molecular weights up to about 100,000 or more, which may contain piperazine rings in the chain. The dicyclopentadiene and the bicycloheptane derivatives contain the dimethyltricyclodecane and dimethylnorbornane radicals, respectively.

Polyaminopoly(methylenephosphonic acids) which are useful in the practice of the invention are, for example, ethylenediaminetetra(methylenephosphonic acid), diethylenetriaminepenta(methylenephosphonic acid) (DTPMP), triethylenetetraminehexa(methylenephosphonic acid) (TTHMP), hexaethyleneheptaminenona(-methylenephosphonic acid) and the like. Others include the analogous polymethylenephosphonic acid derivatives of polypropylenepolyamines such as di-1,2-propylenetriaminepenta(methylenephosphonic acid).

Nonionic surfactants within the scope of the invention, but not limited thereto, include the condensation products of alkylene oxides and alkyl phenols. Thus, useful nonionic surfactants are, e.g. polyethoxyalkylphenols wherein the alkyl group contains 4 to 12 carbon atoms and wherein the number of ethylene oxide (EO) groups condensed with the alkyl phenol may range from 6 to 15. Other nonionic surfactants include naturally occurring surfactants such as mixed alkyl glucosides and oligosaccharides. The mixed alkyl glucosides also benefit the formulation by providing a homogeneous, substantially neutral pH mixture in combination with ethylene glycol, glycerine and the like polyhydroxy compounds.

The weight ratio of the phosphonic acid derivative to that of the surfactant can be varied within the range of from about 1/10 to about 20/1. A preferred range is from about 1/5 to about 10/1.

The following examples show the use of a screening test used in selecting those combinations which are useful in practicing the invention.

SCREENING TEST (HOT WIRE TEST PROCEDURE)

A nichrome wire (26 gauge), 20"(50,8 cm) in length, is bent into a helical coil, weighed on an analytical balance and connected to a variable power source with an ammeter for measuring the current through the wire. The wire is then immersed in a glass vessel containing 200 ml of black liquor obtained from a pump mill. A 2-amp current is then passed through the wire coil for a given period of time, eg. 30 minutes. This causes the wire to get hot and, of course, heats the surrounding liquor. The current is then cut off and the wire disconnected from the source, cooled, dipped in acetone to remove excess solution, dried and weighed to determine the amount of scale deposit. The maximum temperature of the solution during the test was 90° C. Analysis of the scale shows it to be primarily $Na_2SO_4$ and organics, with $CaCO_3$ being present in lesser amounts.

EXAMPLE 1

In accordance with the above screening procedure several tests are made on control samples which contain no additive. The same tests are made on solutions of the black liquor containing measured amounts of a 1% aqueous solution (active content) of the particular additive. The % scale reduction was obtained by dividing the weight gain of the control minus the weight gain of the test composition by the weight gain of the control. The result times 100 gives the % reduction. The results of comparative tests of several known commercial scale inhibitors (Examples A through F) and a composition (DTPMP+surfactant) of the invention (Example 1) are shown in Table I.

TABLE I
SUMMARY OF SCREENING DATA

| Compound/20 ppm | Average % Scale Reduction* |
| --- | --- |
| Control/No additive | 0 |
| Ex. 1 DTPMP acid + 10 ppm surfactant # | 37 |
| Ex. A HEDP acid | −49 |
| Ex. B Polyacrylic acid (low m.w.) | −23 |
| Ex. C Polymaleic acid | −15 |
| Ex. D Sulfonated polystyrene | −44 |
| Ex. E Blend X** | −15 |
| Ex. F Blend Y** | 8 |

Surfactant is polyethoxynonylphenol (10 mols ethylene oxide)
*Negative numbers indicate promotion of scale, not reduction, as compared to the control.
**Blend X is a commercial scale inhibitor formulation containing a phosphonate and a polyacrylate. Blend Y is a commercial inhibitor containing an aminophosphonic acid and another chelant.

The following experiments are tests of scale inhibitors run in a pressure vessel in order to simulate more closely the conditions found in pulp manufacture.

EXAMPLE 2

A six-foot length of 1/8" thinwall stainless steel tubing is formed into a coil and mounted on the inside of the cover of a Parr bomb pressure vessel so that a heating medium can be passed through the interior of the coil. The weight of the coil is then determined prior to its being placed into the vessel which contains the black liquor (ca. 700 ml) obtained from a pulp mill. After the coil is placed into the bomb, the cover is fitted and sealed, the coil connected to a source of heat (steam) and heating begun. The black liquor is then heated to a temperature of 140° C. and maintained at that temperature for a period of three days (72 hrs). At the end of this time the steam is turned off, the bomb is cooled, the coil is disassembled, washed with water, dried in a vacuum oven and finally cooled and is weighed to determine the weight gain. Several replications are made to determine an average weight gain (due to deposition of scale from the liquor) with no scale inhibitor present. Additives are then tested adding various amounts of a 1% aqueous solution (active content) of each, as before. The percent scale reduction is calculated as previously shown. Analysis of the scale shows it to be about 95% $CaCO_3$ and 3% organic material, essentially the same as found in the black liquor heaters of commercial pulp mills. Results of several commercial inhibitors (Examples G through J) and various formulations of the invention (Examples 2a through 2e) are shown in Table II.

TABLE II

| Example No. | Compound/Amount | % Scale Reduction |
| --- | --- | --- |
| Blank | Control/None | 0 |
| Ex. G | Blend X/20 ppm (Comp.) | 8 |
| Ex. H | Blend Y/20 ppm (Comp.) | 3 |
| Ex. I | Blend Z*/20 ppm (Comp.) | 5 |
| Ex. J | DTPMP/20 ppm (Comp.) | 16.5 |
| Ex. 2a | DTPMP/10 ppm + Tergitol NP-10**/20 ppm | 51.8 |
| Ex. 2b | DTPMP/10 ppm + Tergitol NP- | 59.0 |

TABLE II-continued

| Example No. | Compound/Amount | % Scale Reduction |
|---|---|---|
| Ex. 2c | DTPMP/5 ppm + Tergitol NP-10/1 ppm (formulated in ethylene glycol) 10/60 ppm | 47.0 |
| Ex. 2d | DTPMP/20 ppm + Tergitol NP-10/4 ppm (formulated in ethylene glycol) | 58.0 |
| Ex. 2e | DTPMP/20 ppm + Tergitol NP-10/10 ppm (formulated in ethylene glycol) | 65.0 |

*Blend Z is a commercially available scale control agent containing a phosphonic acid and a polymeric carboxylic acid.
**Tergitol NP-10 is the tradename for an ethoxylated nonylphenol containing 10 moles of ethylene oxide available from Union Carbide Company.

EXAMPLE 3

The procedure of Example 2 is followed except that a five-foot length of stainless tubing is employed, hot oil is used as the heat source instead of steam and the duration of the test is 24 hours. A commercial product is tested for comparison with a product of the invention, concentrations being based on active content as before. The composition of the invention contained 24% DTPMP acid, 4.2% Tergitol NP-10, 7.0% Triton BG-10* and 27% ethylene glycol, the balance being water. The solution had a pH of 4. A commercially available high temperature calcium carbonate inhibitor employed for comparison is an aqueous solution containing an anionic surfactant (55%) and a polyacrylate (12%) used at three different concentrations (Examples K, L and M). The results, shown also at three concentrations (Example 3a through 3c), are given in Table III.

* A commercially available, naturally derived nonionic surfactant containing alkyl glucosides and mixed oligosaccharides sold by Rohm & Haas.

TABLE III

| Run No. | Compound/Amount (ppm) | % Scale Reduction |
|---|---|---|
| Blank | Control/None | 0 |
| Ex. K | Commcl. product/5 | 5% |
| Ex. L | Same/20 | 18% |
| Ex. M | Same/40 | 21% |
| Ex. 3a | Chelant + surfactant/5 | 26% |
| Ex. 3b | Same/7 | 38% |
| Ex. 3c | Same/13.5 | 89% |

EXAMPLE 4

In a trial in a commercial pulp mill, the digester heater chosen for the test is operated for 5 days (during which time 4900 tons of pulp is produced) until the heat transfer decreases to an unacceptable level and is shut down to be acid cleaned. For the next heater cycle the scale inhibitor of the invention is added on a continuous basis to the pulp liquor. The composition [containing DTPMP (21% by weight), Tergitol NP-10 (4% by weight) and ethylene glycol (52% by weight), the balance being water] is added at 65 ppm. (This amount of the composition represents about 14 ppm. DTPMP and about 3 ppm. surfactant based on the black liquor.) The heater runs for about 8 days (during which time 7400 tons of pulp is produced) before the heat transfer again becomes unacceptable. After discontinuing the use of the inhibitor, the heater scales up again, the heat transfer becoming unacceptable after about 4 days of exposure to the untreated black liquor (during which time only 3200 tons of pulp is produced).

EXAMPLE 5

In another pulp mill trial a composition of the invention is employed which contains two different surfactants. This combination provides a homogeneous composition at a neutral pH. The digester heater is operated for four days (during which time 3000 tons of pulp is provided) before scale deposition required acid cleaning. The formulation of Example 3 is added at 65 ppm based on the black liquor. This provides 9 days of operation (during which time 9000 tons of pulp is produced) before heat transfer becomes unacceptable. After discontinuing the use of the scale inhibitor, the heater scales up again in 3 days (during which time 3000 tons of pulp are produced).

We claim:

1. In the process for inhibiting scale in pulp mill kraft digesters by the addition of an aminopoly(alkylenephosphonic acid) to the pulp liquor the improvement which comprises adding the aminopoly(alkylene phosphonic acid) in combination with one or more nonionic surfactants.

2. The process of claim 1 wherein the polyaminopoly-(alkylenephosphonic acid) has the formula

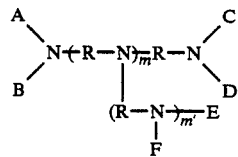

wherein substituents, A, B, C, D, E and F are independently selected from hydrogen or

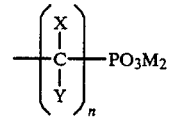

wherein X and Y are independently selected from hydrogen, $PO_3M_2$ and hydrocarbon radicals having from 1-3 carbon atoms and wherein n is 1-3, with the proviso that when n>1, each X and Y may be the same as or different from any other X or Y on any carbon atom, and wherein M is hydrogen, ammonium or an alkali metal; R is a hydrocarbon residue, having two or more carbon atoms, which can be a linear, branched, cyclic, heterocyclic, substituted heterocyclic, or a fused ring-type structure and m is 1-500 and m' is 0-500; with the further proviso that when m or m'>1 the E and F substituents may be the same as or different from any other nitrogen atom substituent and each R may be the same as or different from any other R, together with atleast one nonionic surfactant which is the condensation product of an alkylene oxide and an alkyl phenol.

3. The process of claim 1 wherein the alkyl group of the alkyl phenol contains 4 to 12 carbon atoms and the alkylene oxide is ethylene oxide.

4. The process of claim 3 wherein the condensation product contains from 6 to 15 moles of ethylene oxide.

5. The process of claim 4 wherein the condensation product is nonyl phenol condensed with 10 moles of ethylene oxide.

* * * * *